Patented Apr. 24, 1923.

1,453,210

UNITED STATES PATENT OFFICE.

CARL THEODOR THORSSELL AND HARALD LUDVIG REINHOLD LUNDÉN, OF GOTTEN-BORG, SWEDEN, ASSIGNORS TO AKTIEBOLAGET KVAFVEINDUSTRI, OF GOTTEN-BORG, SWEDEN.

PROCESS FOR PURIFYING THE RESIDUE OBTAINED IN PRODUCING AMMONIA FROM CYANIDE.

No Drawing.    Application filed July 9, 1919.   Serial No. 309,735.

*To all whom it may concern:*

Be it known that we, CARL THEODOR THORSSELL, a citizen of Sweden, residing at Kopmansgatan 20, Gottenborg, Sweden, and HARALD LUDVIG REINHOLD LUNDÉN, a citizen of Sweden, residing at Kopmansgatan 20, Gottenborg, Sweden, have invented certain new and useful Improvements in Processes for Purifying the Residue Obtained in Producing Ammonia from Cyanides, of which the following is a specification.

This invention relates to a process for carrying out chemical reaction between gases and solid substances at high temperatures, and especially for the production of cyanides.

It is well known that scientists and technists have for a long time past, and up to the present day, been investigating the possibility of fixing nitrogen in the form of cyanide by allowing it to react upon a mixture of coal and alkali metals, or alkaline-earth metals or their compounds, at high temperatures. In carrying out experiments on a larger scale, however, difficulties arose which rendered a continuous factory-working impossible, and it has hitherto proved a failure to eliminate these difficulties.

The present invention has for its object to remove the substantial obstacles to a continuous and regular factory-working.

Attempts have been made to add substances which accelerate the reaction, but nothing has been done with regard to substances in the form of impurities that impede the reaction.

It is evident that it is of great importance for accomplishing a real continuous factory-working according to these methods to bring the base, alkali or alkaline-earth, back into the process, if ammonia is produced from the cyanide obtained. This can, however, not be done in methods hitherto known more than up to a certain time, as the mixture brought back soon loses its power of reaction.

This power of reaction is particularly reduced by the presence of silicic acid, alumina, and the like, in the mixture of reaction, which substances come in partly with the charcoal, partly with the materials in the form of earth and sand, and partly during the reaction proper, especially when for instance earthen vessels are used. Amongst these substances the silicic acid forms silicates with the base present in the mixture, i. e. with the alkali or the alkaline earth, and the alumina forms aluminates. It has become evident, that even a small percentage of such impurities reduces the power of reaction in the highest degree in such a way, that the alkali or alkaline-earth compound present, is transformed into nitrogen compounds with much greater difficulty. This is especially shown by the fact that the temperature must be considerably raised in order to obtain a fairly moderate yield, and this necessary increase of temperature must be increased in accordance with the percentage of impurities.

For instance, assume a mixture of carbonate of barium and coal is used, thru which a current of nitrogen is passed for the formation of cyanide of barium, to be used for the production of ammonia. It will be evident, that an impurity of silicic acid present, which forms silicate of barium with the carbonate of barium

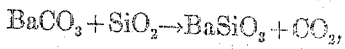

$$BaCO_3 + SiO_2 \rightarrow BaSiO_3 + CO_2,$$

corresponds to between three and four fold quantity of carbonate of barium. Thus the power of reaction is subsequently considerably reduced and the mass will even become eventually entirely inactive. A similar action results when for instance carbonate of sodium is used in the reaction, in which case the fixing of nitrogen ceases when the mass contains a quantity of silicic acid corresponding to half the quantity of carbonate of sodium.

According to the present invention the silicate and aluminate are decomposed by means of a suitable acid stronger than silicic acid, alumina, or other impurity. Such acids however, must not contain any substances other than oxygen, hydrogen, carbon, and nitrogen, in order that the mass of reaction may not become impure. One of the most suitable and the cheapest acid of this kind is carbon dioxid. Thus, if carbon dioxid or gas containing carbon dioxid, is led thru a mass dissolved, or stirred up, in water, the silicic acid will precipitate in the form of hydrate. If the carbon dioxid is introduced in the form of a moderately diluted solution, then the silicic acid precipitates in a gelatinous condition. It is preferred, however, to introduce the carbon dioxid at high temperatures and at high pressures, in such a manner that the precipitate becomes pulverulent and thus may be removed more easily, as it is difficult to filter and wash the same in a gelatinous condition. When alkaline earth compounds are used as ingredients in the mass of reaction, it is evident that carbon dioxid cannot be used, while their insoluble carbonates cannot be separated from the precipitated impurities.

Thus the new process is only a process for purifying the mass that remains when all the nitrogen in the cyanide holding mass of reaction in a known manner by treating with water (optionally under pressure and heating) has been transferred into ammonia. Instead of adding carbon dioxid the mass may also be purified by making the solution caustic by means of oxide of calcium. In this case a precipitate is obtained which is granular and easy to wash.

What we claim is:—

The herein described process of purifying a hydrolized product of a cyanide-forming reaction characterized in that the compounds present in the mass of reaction and consisting of silicates and aluminates, which are formed by the reaction by the base used in the mass, after water treatment of the cyanide-holding mass for the production of ammonia, are decomposed by carbon dioxide.

In testimony whereof, we have signed our names to this specification in the presence of two subscribing witnesses.

CARL THEODOR THORSSELL.
HARALD LUDVIG REINHOLD LUNDÉN.

Witnesses:
   JOHN TEROLF CLARENS,
   CEBUR M. ANDERSON.